US012463963B2

(12) United States Patent
Ahuja et al.

(10) Patent No.: US 12,463,963 B2
(45) Date of Patent: Nov. 4, 2025

(54) CENTRALIZED AUTHENTICATION STORAGE AND MANAGEMENT FOR CLOUD-BASED SERVICES (71) Applicant: Verizon Patent and Licensing Inc., Basking Ridge, NJ (US)

(72) Inventors: Sanjay Ahuja, Irving, TX (US); Praveen Atreya, Martinsville, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 89 days.

(21) Appl. No.: 18/589,148

(22) Filed: Feb. 27, 2024

(65) Prior Publication Data
US 2025/0274447 A1 Aug. 28, 2025

(51) Int. Cl.
*H04L 9/40* (2022.01)
(52) U.S. Cl.
CPC ........ *H04L 63/083* (2013.01); *H04L 63/0876* (2013.01); *H04L 63/20* (2013.01)

(58) Field of Classification Search
CPC .... H04L 63/083; H04L 63/0876; H04L 63/20
See application file for complete search history.

(56) References Cited

U.S. PATENT DOCUMENTS

| | | | |
|---|---|---|---|
| 10,721,232 B2* | 7/2020 | Peterson | H04L 63/10 |
| 2012/0227098 A1* | 9/2012 | Obasanjo | H04L 63/0807 726/8 |
| 2017/0099362 A1* | 4/2017 | Almond | H04L 63/08 |
| 2020/0228350 A1* | 7/2020 | Rydkin | G06F 21/30 |
| 2024/0291839 A1* | 8/2024 | Yagnik | H04L 51/214 |

* cited by examiner

Primary Examiner — Abiy Getachew (57) ABSTRACT

Systems and methods for providing centralized authentication storage and management are described. An illustrative method includes a gateway device detecting that a first computing device connected to an on-premises network logs into a cloud-based service by way of the gateway device, stores an authentication token provided to the gateway device by the cloud-based service, and obtains authorization data indicating that a second computing device connected to the on-premises network is authorized to access the cloud-based service. The method may further include a gateway device that shares the authentication token with a second computing device.

20 Claims, 8 Drawing Sheets

```
┌─────────────────────────────────────────────────────────────────────────────┐
│ Detect that a first computing device connected to a on-premises network     │
│ logs into the cloud-based service by way of a gateway device                │
│                                   302                                        │
└─────────────────────────────────────────────────────────────────────────────┘
                                     │
                                     ▼
┌─────────────────────────────────────────────────────────────────────────────┐
│ Store, based on the first computing device accessing the cloud-based        │
│ service, an authentication token provided to the gateway device by the      │
│ cloud-based service                                                          │
│                                   304                                        │
└─────────────────────────────────────────────────────────────────────────────┘
                                     │
                                     ▼
┌─────────────────────────────────────────────────────────────────────────────┐
│ Obtain authorization data indicating that a second computing device         │
│ connected to the on-premises network is authorized to access the            │
│ cloud-based service                                                          │
│                                   306                                        │
└─────────────────────────────────────────────────────────────────────────────┘
                                     │
                                     ▼
┌─────────────────────────────────────────────────────────────────────────────┐
│ Share the authentication token with the second computing device             │
│                                   308                                        │
└─────────────────────────────────────────────────────────────────────────────┘
```

CENTRALIZED AUTHENTICATION STORAGE AND MANAGEMENT FOR CLOUD-BASED SERVICES

BACKGROUND INFORMATION

Cloud-based services may provide various types of content and/or data to users over a network. Such cloud-based services may require users to provide authentication credentials such as a password to access the content and/or data. However, conventional authentication methods using passwords may cause a variety of security issues. For example, users often struggle to manage multiple passwords across different applications, and requirements for complex passwords makes this even harder. Moreover, setting up applications on multiple home devices, factory resets, and forgotten passwords may cause users to use easily guessable and similar passwords across different applications. It may therefore be desirable to improve the technologies used to manage and store authentication credentials.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Computer-implemented methods and systems for providing centralized authentication storage and management for cloud-based services are described herein. In some implementations, the methods and system may use a gateway device (e.g., Consumer Premises Equipment (CPE)) to store and provide authentication tokens. The authentication tokens may provide authorized devices within an on-premises network with access to various cloud-based services.

As described above, cloud-based services may provide various types of content and/or data to users over a network by way of a gateway device. For example, a cloud-based service may provide streamed video content to members of a household over a wired or wireless network by way of a gateway device. Users may access the content and/or data via various computing devices (e.g., smartphones, tablets, smart TV's, etc.) connected to the gateway device by way of the wired or wireless network.

Conventionally, cloud-based services may require users to input passwords and/or other user credentials to access the content and/or data. However, conventional authentication methods using passwords may be difficult and cumbersome for a variety of reasons. For example, a user may possess numerous accounts for a variety of cloud-based services. Each service may have its own requirement for a suitable password. It may be difficult, then, for the user to keep track of and manually input many passwords that are different from one other to use the different cloud-based services. Additionally, passwords may be changed periodically, such as from an automatic password reset or a manual change from a user. This may particularly cause issues when the password is shared with a large group of users, as conventionally, a user would have to manually inform the entire group of the password change.

Conventional authentication methods using passwords may also cause various security issues, such as unwanted access to services from unauthorized users. Consider, for example, a scenario where a user enters a password at a device (or otherwise shares the password with the device) that belongs to another user (e.g., a friend of the user). The user may wish to give temporary access only to the other user. In many scenarios, however, passwords are stored at a device after the passwords are shared with the device. Thus, the user may inadvertently grant permanent access to the other user. This may be particularly problematic in scenarios involving minors, who may be able to bypass parental controls by acquiring permanent access to accounts associated with adults. Storing the passwords on devices may also cause the corresponding user accounts to be more vulnerable to security attacks and/or threats. Attackers may gain access to the device and thus gain access to numerous passwords stored on the device.

To address these and/or other challenges, computer-implemented methods and systems for providing centralized authentication storage and management are described herein. For example, a gateway device may store and provide authentication tokens to authorized devices within an on-premises network for providing access to various cloud-based services. In some embodiments, as described further herein, the gateway device may detect that a first computing device connected to the on-premises network logs into the cloud-based service by way of the gateway device, store an authentication token provided to the gateway device by the cloud-based service, and obtain authorization data indicating that a second computing device connected to the on-premises network is authorized to access the cloud-based service. The gateway device may then share the authentication token with the second computing device. The authentication token may provide the second computing device (and/or other authorized devices) with access to the cloud-based service.

Providing centralized authentication storage and management in this manner may provide various benefits and/or advantages. For example, using authentication tokens stored at a gateway device removes the need for passwords for accessing cloud-based services. This may avoid the risk of users forgetting their user credentials. Additionally, users may no longer need to share passwords with other entities, thus allowing the users to provide authentication to the other entities more securely. The gateway device may also provide secure and centralized storage for the authentication tokens, thus reducing the likelihood of unwanted access to authentication credentials from external devices. The gateway device may also allow users to monitor usage of the authentication tokens in a more centralized manner, thus providing for more efficient and accessible management of the authentication tokens. Additional and/or alternative benefits and/or advantages provided by the example embodiments described herein may be made apparent herein.

Figure 1:
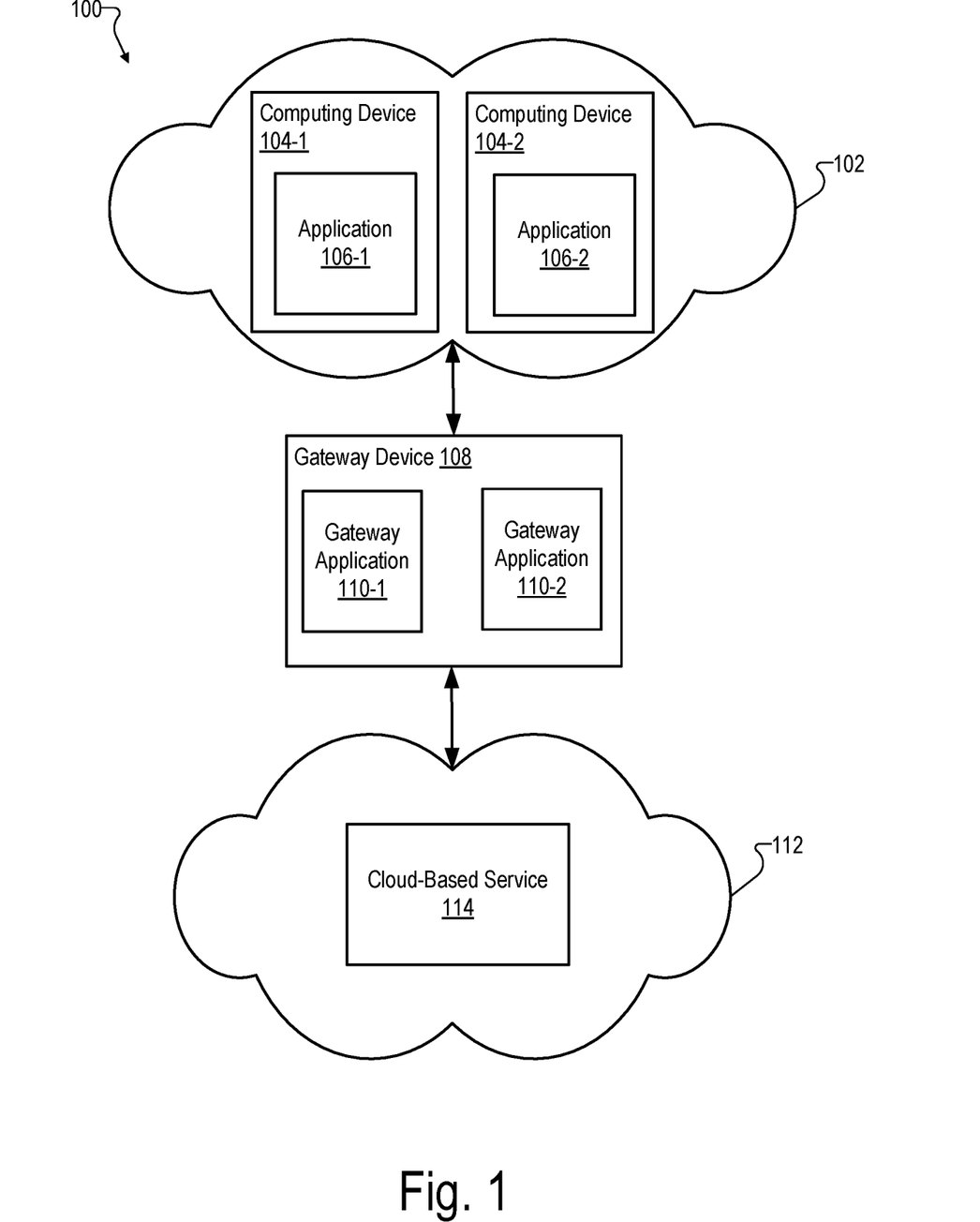
FIG. 1 depicts an illustrative routing environment configured to provide centralized authentication storage and management within an on-premises network according to principles described herein.

FIG. 1 depicts an illustrative routing environment 100 configured to provide centralized authentication storage and management within an on-premises network 102 according to principles described herein. As shown, routing environment 100 may include an on-premises network 102, computing devices 104 deploying applications 106, a gateway device 108 deploying gateway applications 110, an external network 112, and a cloud-based service 114 connected to external network 112.

On-premises network 102 may be implemented by any configuration of network devices that provides a wireless and/or wired communications network to which appropriately configured local devices (e.g., computing devices 104) may connect and access services (e.g., cloud-based service 114) provided over on-premises network 102. On-premises network 102 may be implemented by any suitable local communications network configured to provide network access to devices within a particular premises (e.g., a home, a business, a building, etc.), such as a local area network (LAN), a Wi-Fi network, a wired ethernet network, and/or any combination thereof.

In some embodiments, on-premises network 102 may be associated with a particular entity, such as an individual, an organization, a business, a housing unit, a family, and/or a locale. For example, on-premises network 102 may provide a wireless network to a family living together in a particular household. In some embodiments, on-premises network 102 may provide a secured and/or private network that prevents access to the network from unauthorized and/or unknown entities. For example, a password may be required for a device attempting to connect to on-premises network 102.

As shown, on-premises network 102 may provide a communication network to computing devices 104 (e.g., computing devices 104-1 and 104-2). Computing devices 104 may be implemented by any suitable computing device for performing computing operations. For example, each computing device 104 may be implemented by a personal computer, a mobile device (e.g., a mobile phone), a gaming console, a smart television, etc.

In some embodiments, each computing device 104 may be associated with (e.g., used by) a particular user and/or entity associated with on-premises network 102. For example, each computing device 104 may be associated with a unique member of a household. Computing devices 104 may be configured to deploy any number of applications, services, and/or microservices. As shown, for example, computing devices may deploy applications 106 (e.g., applications 106-1 and 106-2). Applications 106 may include any suitable application of any suitable application type, such as containerized applications, web programs, deployment tools, authentication services, network services, security services, entertainment services, data services, database applications, and/or data analytics platforms. For example, applications 106 may provide access to a video streaming service for presenting video content on computing devices 104 by way of on-premises network 102.

Gateway device 108 may include any device and/or configuration of devices configured to manage network traffic between on-premises network 102 and external network 112 (and/or any other combination of networks). For example, gateway device 108 may be implemented by a routing device (e.g., a router such as a wireless router, a wired router, an edge router, a virtual router, etc.), an access point (e.g., a wireless access point), a network bridge (e.g., a local bridge, a remote bridge, etc.), a gateway, a hub (e.g., a multi-port hub), a modem, a repeater, a network switch (e.g., a multi-layer switch), and/or any suitable combination thereof. For example, in some embodiments, gateway device 108 may be implemented by a routing device configured to forward data packets between on-premises network 102 and external network 112 by determining various routing paths.

In some embodiments, gateway device 108 may deploy one or more gateway applications 110 (e.g., gateway applications 110-1 and 110-2) for performing various routing services and/or operations. Gateway applications 110 may include any suitable application of any suitable application type, such as containerized applications, web programs, deployment tools, authentication services, network services, security services, data services, database applications, and/or data analytics platforms. For example, gateway device 108 may deploy a dedicated authentication application for managing authentication of computing devices 104 (and/or any other suitable devices) within on-premises network 102 (and/or any other suitable network).

External network 112 may be implemented by any configuration of network devices that provides a wireless and/or wired communications network to devices and/or services outside of on-premises network 102. As shown, for example, external network 112 may provide a communications network to cloud-based service 114. External network 112 may provide any suitable communications network outside of on-premises network 102, such as the Internet, a cellular network, a wide area network, a fifth generation new radio (5G NR) network, a fourth generation (4G) Long Term Evolution (LTE) network, a 4.5G LTE network, a Voice over IP (VoIP) network, a Voice over LTE (VOLTE) network, a radio frequency (RF) network, a millimeter wave radio network, a high frequency band radio network, and/or any combination thereof.

Cloud-based service 114 may include any suitable service configured to provide content and/or data over a network to one or more computing devices (e.g., computing devices 104. For example, cloud-based service 114 may include streaming content services (e.g., video streaming services, music streaming services), gaming services (e.g., digital distribution platforms), social media services (e.g., social networking websites), messaging services (e.g., text messaging services), and/or storage services (e.g., cloud storage services). As shown, cloud-based service 114 may be connected to external network 112 and provide content and/or data to computing devices 104 by way of gateway device 108.

In some embodiments, computing devices 104 (and/or any other devices deployed within on-premises network 102) may access cloud-based service 114 using applications 106 and gateway device 108. For example, applications 106 may provide a user interface for interacting with content provided by cloud-based service 114 (e.g., streamed media content). In this manner, one or more users of computing devices 104 may be customers and/or clients of cloud-based service 114.

In some situations, computing devices 104 (and/or any other entities) may be required to be authenticated to access cloud-based service 114. For example, computing devices 104 may provide cloud-based service 114 with a password (and/or any other user credential). Alternatively, and/or additionally, cloud-based service 114 may provide authentication tokens to authorized devices to allow access to cloud-based service 114. As described in detail herein, gateway device 108 may store such authentication tokens and automatically provide the tokens to authorized devices within on-premises networks to provide access to cloud-based service 114.

Figure 2:
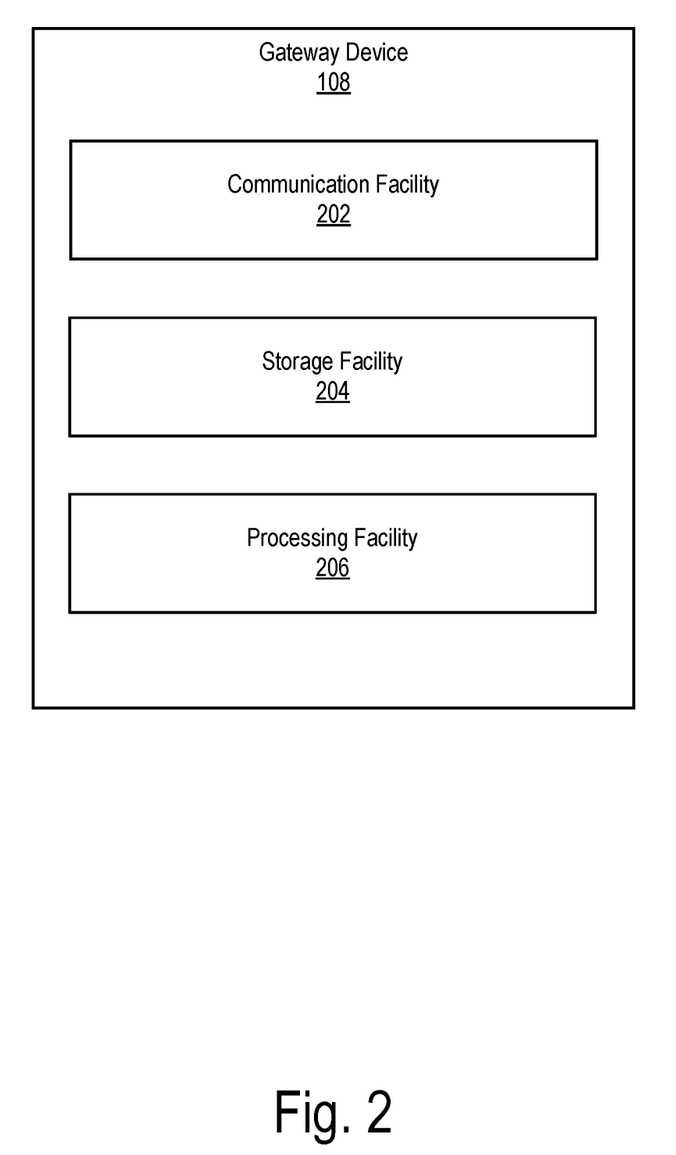
FIG. 2 depicts illustrative components of a gateway device according to principles described herein.

FIG. 2 depicts illustrative components of gateway device 108 according to principles described herein. As shown in FIG. 2, gateway device 108 may include, without limitation, a communication facility 202, a storage facility 204, and a processing facility 206 selectively and communicatively coupled to one another. Facilities 202-206 may each include or be implemented by one or more physical computing devices including hardware and/or software components such as processors, memories, storage drives, communication interfaces, instructions stored in memory for execution by the processors, and so forth. Although facilities 202-206 are shown to be separate facilities in FIG. 2, facilities 202-206 may be combined into fewer facilities, such as into a single facility, or divided into more facilities as may serve a particular implementation. In some examples, each of facilities 202-206 may be distributed between multiple devices and/or multiple locations as may serve a particular implementation.

Communication facility 202 may be configured to communicate with other elements of on-premises network 102 and/or external network 112 using any suitable communication technologies, such as physical and/or virtual ports connected to on-premises network 102 and/or external network 112. Communication facility 202 may send and/or receive any suitable network traffic to/from on-premises network 102 and/or external network 112 as discrete data packets. The data packets may include data and/or instructions (e.g., IP addresses) used by gateway device 108 to forward packets to any suitable network and/or device.

Storage facility 204 may be configured to store (and/or otherwise manage) any data received, generated, managed, used, and/or transmitted by processing facility 206. Storage facility 204 may store executable data used by processing facility 206 to perform any of the functionality described herein. For example, storage facility 204 may store instructions that may be executed by processing facility 206 to perform one or more of the operations described herein. The instructions may be implemented by any suitable application, software, code, and/or other executable data instance. In some embodiments, storage facility 204 may store data and/or instructions for authenticating devices within a network, such as authentication tokens (and/or other types of user credentials) for authenticating devices to access various applications and/or services (e.g., cloud-based service 114) and/or metadata (e.g., authentication parameters) associated with stored user credentials.

Processing facility 206 may be configured to perform (e.g., execute instructions stored in storage facility 204 to perform) one or more of the network services described herein. For example, as described further in detail herein, processing facility 206 may be configured to perform operations for providing authentication services within a network (e.g., on-premises network 102). In some embodiments, processing facility 206 may be configured to deploy one or more applications to perform various network services, such as an authentication application for performing authentication services and/or a gateway application for performing routing services. Processing facility 206 may be implemented by one or more computer processing devices, such as general-purpose processors (e.g., central processing units (CPUs), graphics processing units (GPUs), microprocessors, etc.), special-purpose processors (e.g., application-specific integrated circuits (ASICs), and/or field-programmable gate arrays (FPGAs), etc.).

Figure 3:
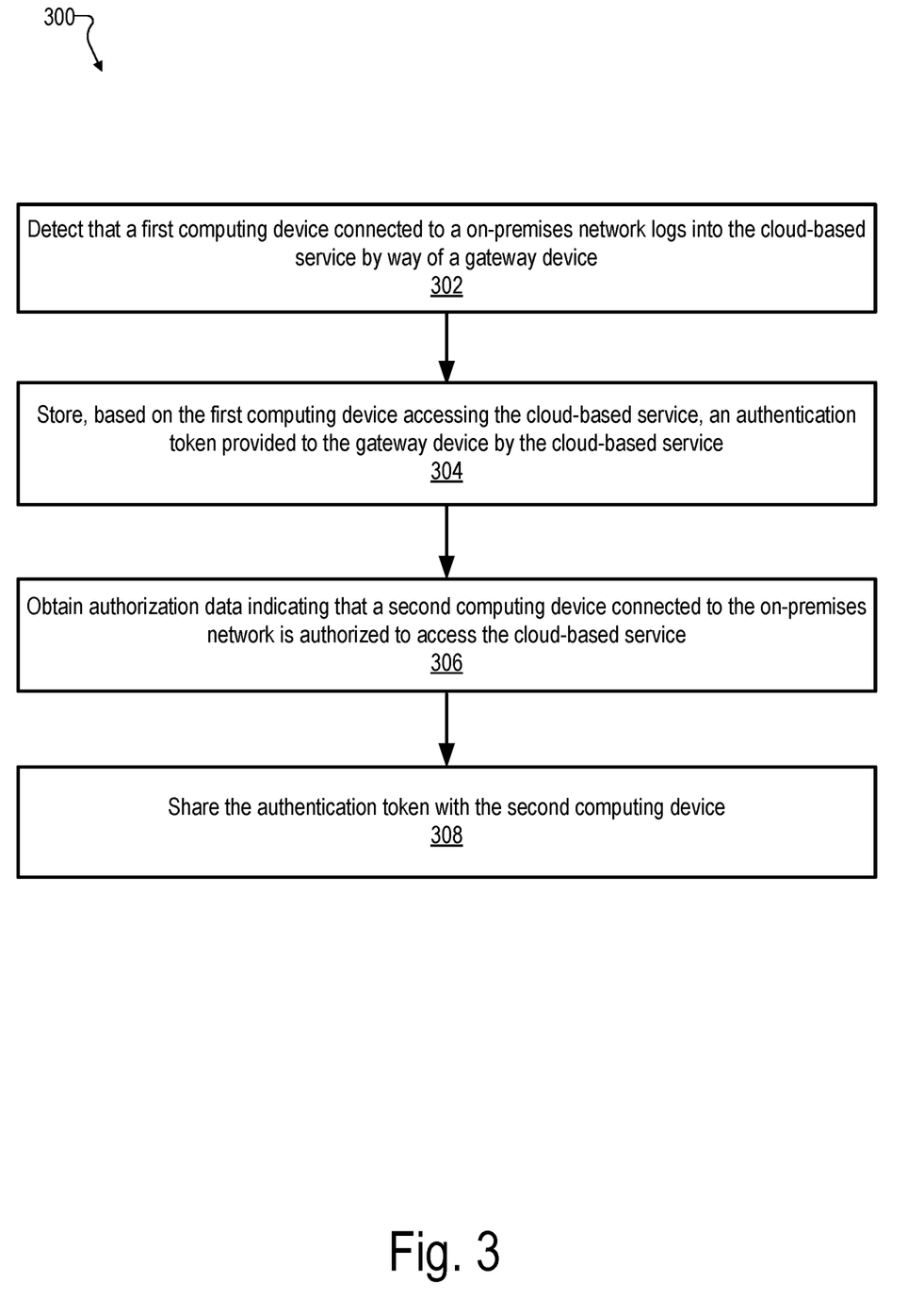
FIG. 3 shows an illustrative method for using a gateway device to provide centralized authentication storage and management in accordance with principles described herein.

FIG. 3 shows an illustrative method 300 for using a gateway device (e.g., gateway device 108) to provide centralized authentication storage and management in accordance with principles described herein. While FIG. 3 shows illustrative operations 302-308 according to one implementation, other implementations may omit, add to, reorder, and/or modify any of the operations 302-308 shown in FIG. 3. In some examples, multiple operations shown in FIG. 3 or described in relation to FIG. 3 may be performed concurrently (e.g., in parallel) with one another, rather than being performed sequentially as illustrated and/or described. One or more of the operations shown in FIG. 3 may be performed by a gateway device such as gateway device 108 and/or any implementation thereof. Each of operations 302-308 of method 300 will now be described in more detail as the operations may be performed by an implementation of gateway device 108 (e.g., by processing facility 206 executing instructions stored in storage facility 204).

At operation 302, gateway device 108 (and/or any other suitable gateway device) may detect that a first computing device (e.g., one of computing devices 104) connected to a on-premises network (e.g., on-premises network 102) logs into a cloud-based service (e.g., cloud-based service 114) by way of gateway device 108. As described above, gateway device 108 may be configured to manage traffic between the on-premises network and the cloud-based service. The first computing device may be implemented by any of the computing devices described herein, such as computing device 104-1. In some embodiments, the first computing device may be associated with an owner and/or administrator within the on-premises network. For example, the first computing device may be associated with an owner or other person living within a housing unit connected to the on-premises network.

The first computing device may log into the cloud-based service using any suitable user credential, such as a password, a PIN, a biometric identifier (e.g., a fingerprint pattern, a voice recording, etc.), an email authentication, and/or a text authentication message. In some embodiments, the first computing device may log into the cloud-based service without the use of an authentication token. The first computing device may log into the cloud-based service by way of an application deployed at the first computing device, such as application 106-1. The application may render a user interface for accessing and/or otherwise interacting with the cloud-based service. In some embodiments, the cloud-based service may alert gateway device 108 when the first computing device logs into the cloud-based service (e.g., using the application deployed at the first computing device).

At operation 304, gateway device 108 may store, based on the detection performed at operation 302, an authentication token provided to the gateway device by the cloud-based service. The authentication token may include any data that can be used as a user credential for accessing the cloud-based service, such as a web token and/or a string object (e.g., a random string of characters). In some embodiments, the authentication token may be cryptographically secured. In some embodiments, the authentication token may not include a password and/or any other additional user credential.

In some examples, the cloud-based service (e.g., a computing device, such as a server, associated with the cloud-based service) may generate the authentication token in response to the first computing device logging into the cloud-based service. In some embodiments, the authentication token may be generated only when the first computing device logs in without the use of an existing authentication token. The generated authentication token may be sent by the cloud-based service to gateway device 108 for storage. Gateway device 108 may store the authentication token within any suitable storage resource, such as storage facility 204.

At operation 306, gateway device 108 may obtain authorization data indicating that a second computing device connected to the on-premises network is authorized to access the cloud-based service. The authentication data may be obtained from any suitable source. In some embodiments, for example, gateway device 108 may receive the authentication data from the first computing device by way of the on-premises network. In some embodiments, the first computing device may generate the authentication data based on a user selection of an option presented within a graphical user interface rendered by the first computing device. The user selection may indicate that the second computing device is authorized to access the cloud-based service using the authentication token. To this end, gateway device 108 may provide information associated with computing devices connected to gateway device 108 to the first computing device. The first computing device may present the information at the user interface and allow the user to authenticate one of the presented devices at the user interface (e.g., by selecting a presented option). In this manner, the user may be informed of and/or manually authenticate any devices connected to the on-premises network.

Additionally, and/or alternatively, gateway device 108 may receive the authorization data from a remote computing device (e.g., a server) associated with the cloud-based service by way of an external network (e.g., external network 112). The external network may provide a communications network to the cloud-based service. The remote computing device may provide various computing resources for executing operations associated with the cloud-based service, such as generating authentication tokens. In some embodiments, the remote computing device may generate the authentication data based on a user selection of an option presented within a graphical user interface rendered by an application associated with the cloud-based service. The remote computing device may access data (e.g., from the cloud-based service and/or gateway device 108) indicating devices that are connected to gateway device 108 (e.g., the second computing device) and present a list of the connected devices at the graphical user interface based on the data. The user selection may indicate that the second computing device is authorized to access the cloud-based service using the authentication token.

In some embodiments, gateway device 108 may generate the authorization data. For example, gateway device 108 may deploy an authentication application (e.g., one of gateway applications 110) for managing various authentication tasks. The authentication application (and/or any other suitable component of gateway device 108) may automatically generate the authentication data after detecting a request from an authorized device (e.g., the second computing device) to log into the cloud-based service. In some embodiments, the authentication application (and/or any other suitable component of gateway device 108) may generate the authentication data based on input from a user of gateway device 108 (e.g., at a user interface rendered by the authentication application).

At operation 308, gateway device 108 may share the authentication token with the second computing device. The authentication token may be useable by the second computing device to access the cloud-based service. Gateway device 108 may share the authentication token in any suitable manner. For example, gateway device 108 may send a copy of the authentication token to the second computing device. In some embodiments, gateway device 108 may provide the authentication token to the cloud-based service on behalf of the second computing device to permit continued access to the cloud-based service (e.g., without sending the authentication token to the second computing device). Gateway device 108 (and/or the cloud-based service) may alert the second computing device that access to the cloud-based service has been granted (e.g., at a user interface rendered by an application associated with the cloud-based service).

In some embodiments, the access by the second computing device to the cloud-based service using the authentication token may be customizable by way of one or more parameters. The parameters may customize any suitable aspect of the authentication token, such as an expiration date associated with the authentication token, an access level associated with the authentication token (e.g., full access, limited access, access only to content for children, etc.), a token type associated with the authentication token, a user identifier (e.g., an identifier for a recipient of the token) associated with the authentication token, a timestamp (e.g., an issue date) associated with the authentication token, and/or an application identifier (e.g., an identifier for an application that the token allows access to) associated with the authentication token. In some embodiments, the parameters may be contained in metadata associated with the authentication token. In some embodiments, the parameters may be contained in the same file and/or dataset as the authentication token (e.g., as attributes and/or fields in a token file). For example, an authentication token may include the parameters as key-value pairs (e.g., as a JSON web token). In some embodiments, a refresh token may be automatically sent to gateway device 108 along with the authentication token and stored at gateway device 108.

While FIG. 3 shows method 300 as including operations 302-308, it is to be appreciated that method 300 may include any number of additional operations described herein. For example, gateway device 108 may obtain additional authorization data indicating that a third computing device connected to the on-premises network is not authorized to access the cloud-based service. The additional authorization data may be obtained using any of the methods described herein (e.g., from the same source as the authorization data). Gateway device 108 may then deny, based on the additional authorization data, the third computing device access to the authentication token. Gateway device 108 (and/or the cloud-based service) may alert the third computing device that access to the cloud-based service has been denied (e.g., at a user interface rendered by an application associated with the cloud-based service).

In some embodiments, gateway device 108 may detect a modification to a user credential (e.g., a password) used by the first computing device (and/or any other authorized device) to log into the cloud-based service. For example, gateway device 108 may detect that a user manually changed his or her password for logging into the cloud-based service. Gateway device 108 may automatically refresh the authentication token (e.g., using a refresh token) and share the refresh authentication token with the second computing device (and/or any other authorized device).

Figure 4:
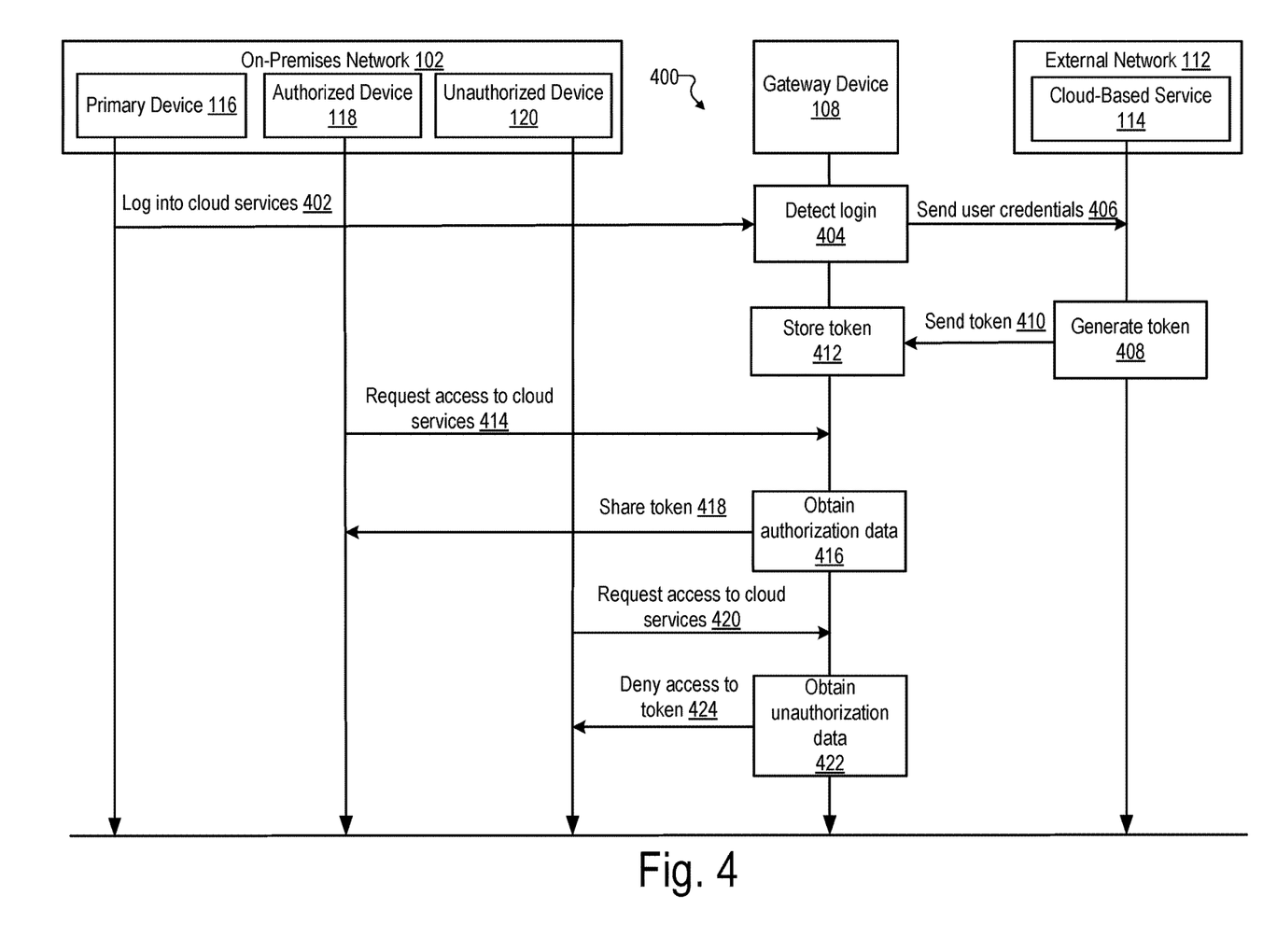
FIG. 4 shows an illustrative method for using a gateway device to provide centralized authentication storage and management in accordance with principles described herein.

To further illustrate method 300, FIG. 4 shows an illustrative method 400 of using a gateway device (e.g., gateway device 108) to provide centralized authentication storage and management in accordance with principles described herein. The configuration depicted in FIG. 4 is used to describe an example of centralized authentication storage and management that can be performed by way of on-premises network 102, gateway device 108, and cloud-based service 114.

As described above, on-premises network 102 may provide a communication network to various computing devices. As shown, for example, on-premises network 102 may provide a network to a primary device 116, an authorized device 118, and an unauthorized device 120. Each of the devices shown may be similar to any of the devices described herein, such as computing devices 104. In this configuration, primary device 116 may represent a device associated with an owner and/or administrator connected to on-premises network 102. Authorized device 118 and unauthorized device 120 may represent secondary devices connected to on-premises network 102 (e.g., devices not associated with the owner and/or administrator). Gateway device 108 may be configured to manage network traffic between on-premises network 102 and external network 112. As shown, external network 112 may provide a communication network to cloud-based service 114.

In some embodiments, various devices connected to on-premises network 102 may attempt to access cloud-based service 114 (e.g., by attempting to log into cloud-based service 114) by way of gateway device 108. For example, as shown at operation 402, primary device 116 may access cloud-based service 114, such as by logging into cloud-based service 114 using a password (and/or any other suitable user credential). At operation 404, gateway device 108 may detect that primary device 116 logged into cloud-based service 114 using a password (and/or without the use of an authentication token). Operation 404 may be similar to operation 302. At operation 406, in response to the detection, gateway device 108 may send the password to cloud-based service 114. At operation 408, cloud-based service 114 may generate an authentication token in response to receiving the password. Cloud-based service 114 may also configure the authentication token by way of one or more parameters (e.g., parameters stored as metadata). At operation 410, cloud-based service 114 may send the authentication token (and/or any suitable metadata) to gateway device 108. At operation 412, cloud-based service 114 may store the authentication token. Operation 412 may be similar to operation 304.

In some embodiments, secondary devices connected to on-premises network may attempt to access cloud-based service 114. For example, as shown at operation 414, authorized device 118 (i.e., a computing device that a user of primary device 116 has authorized to access cloud-based service 114) may request access to cloud-based service 114 by way of gateway device 108. At operation 416, gateway device 108 may obtain authorization data indicating that authorized device 118 is authorized to access the cloud-based service. Operation 416 may be similar to operation 306. At operation 418, gateway device 108 may share the authentication token with authorized device 118. Operation 418 may be similar to operation 308. Authorized device 118 may use the authentication token to access cloud-based service 114.

At operation 420, unauthorized device 120 (i.e., a computing device that a user of primary device 116 has not authorized to access cloud-based service 114) may request access to cloud-based service 114 by way of gateway device 108. At operation 422, gateway device 108 may obtain additional authorization data indicating that unauthorized device 120 is not authorized to access cloud-based service 114. At operation 424, gateway device 108 may deny unauthorized device 120 access to the stored authentication token based on the additional authorization data.

Figure 5A:
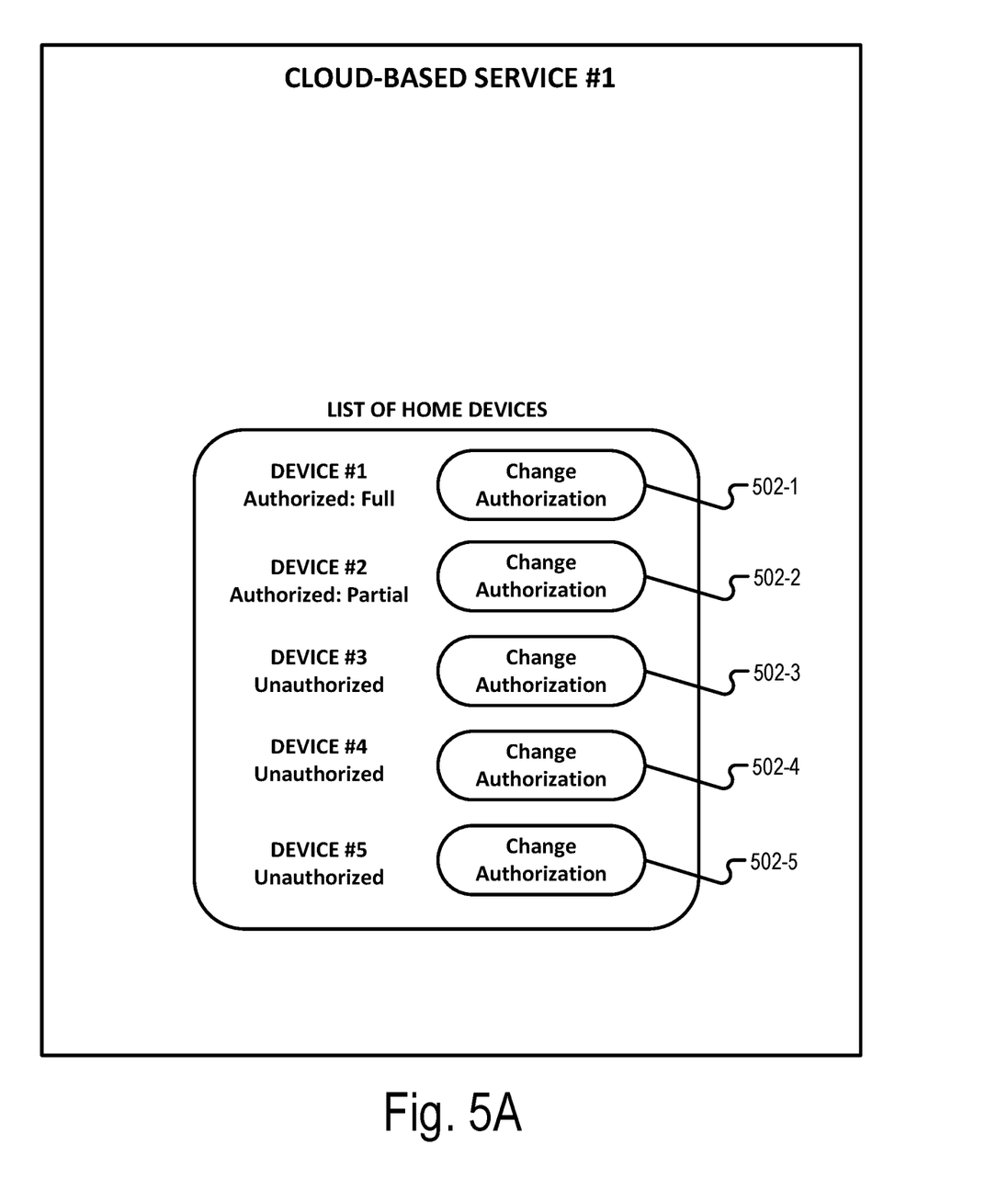
FIG. 5A shows an illustrative user interface in accordance with the principles described herein.
Figure 5B:
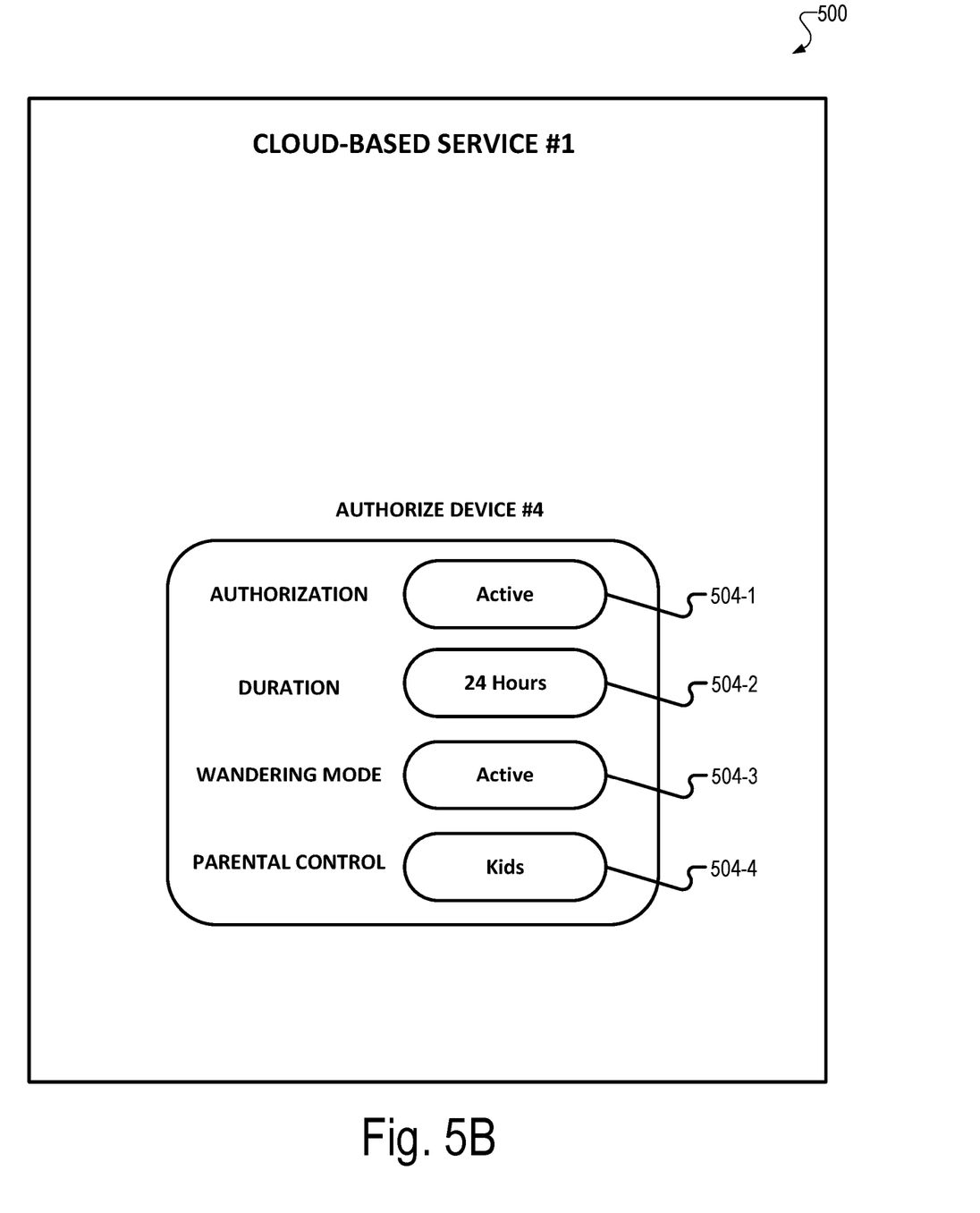
FIG. 5B shows an illustrative user interface in accordance with the principles described herein.
Figure 5C:
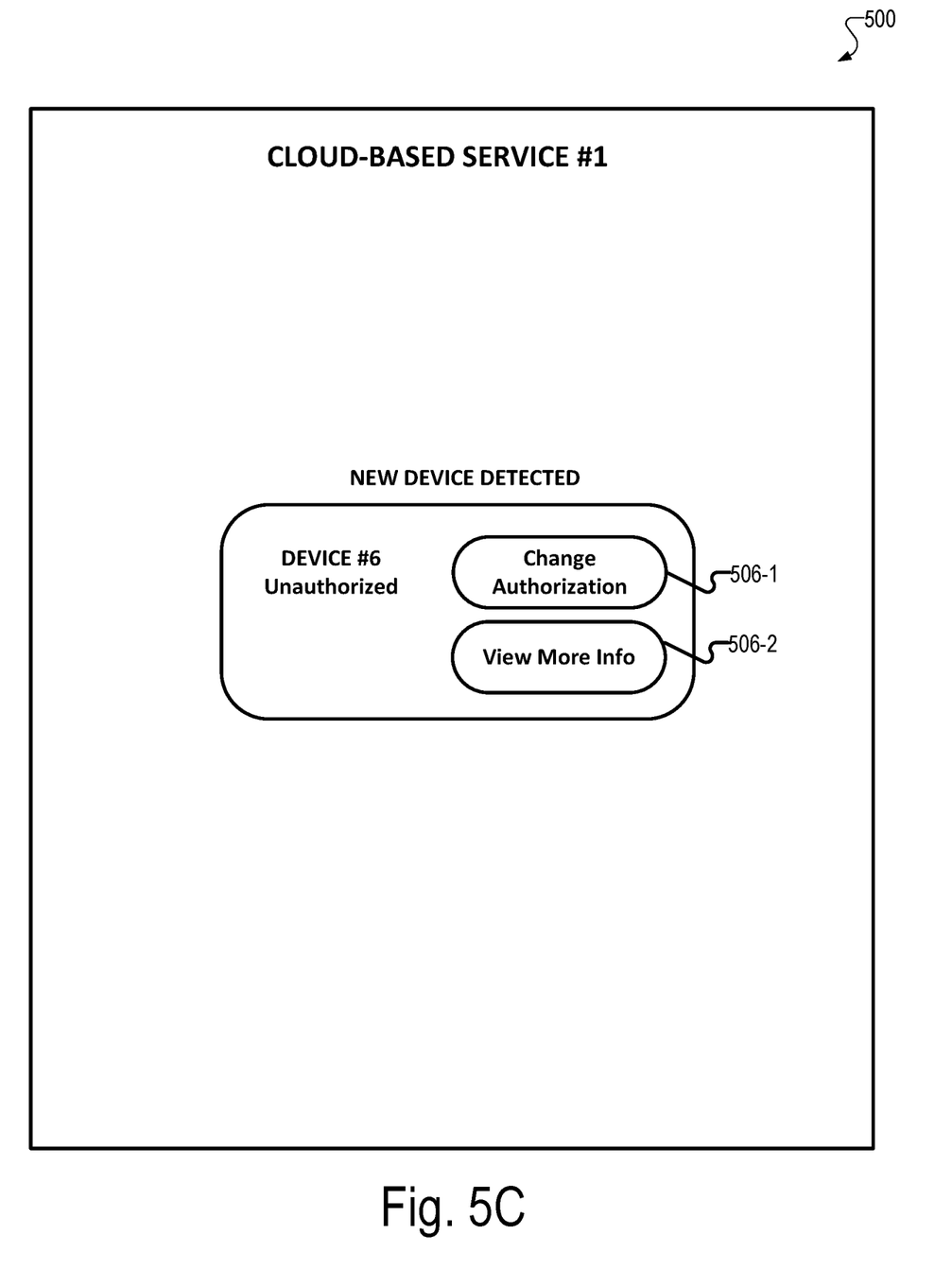
FIG. 5C shows an illustrative user interface in accordance with the principles described herein.

FIGS. 5A-5C show an illustrative user interface 500 with which a user may interact with to initiate various operations associated with centralized authentication storage and management using a gateway device (e.g., gateway device 108). User interface 500 may be rendered by a suitable application (e.g., applications 106 deployed at computing devices 104) associated with a cloud-based service (labeled as "Cloud-based service #1" in FIGS. 5A-5C) connected to an external network (e.g., external network 112). The cloud-based service may provide content to user interface 500 by way of the gateway device. It is to be appreciated that user interface 500 may be associated with any of the operations and/or methods described.

User interface 500 may present content associated with one or more devices connected to a network, such as on-premises network 102. As shown in FIG. 5A, the connected devices are labeled as "Device 1" to "Device 5." The connected devices may be any suitable computing device associated with the cloud-based service, such as devices currently with access to the cloud-based service, devices that have requested access to the cloud-based service, and/or devices that are capable of accessing the cloud-based service. User interface 500 may receive information associated with the connected devices from the gateway device and/or the cloud-based service. User interface 500 may automatically present the content associated with the connected devices when a user launches user interface 500. User interface 500 may present one or more options 502 (e.g., options 502-1 to 502-5) for managing authentication of the connected devices to access the cloud-based service. Options 502 may include any suitable combination of selectable items for initiating operations associated with the connected devices, such as changing authorization parameters associated with the connected devices (e.g., changing an authorization status), viewing more information associated with the connected devices (e.g., a connection time period, an expiration time, current parameters, a device type, associated users), modifying user credentials associated with the connected devices, changing notification settings associated with the connected devices (e.g., allowing notifications when a connected device requests access to the cloud device), and/or creating user groups associated with the connected devices.

FIG. 5B shows user interface 500 after a user has selected an option for managing authorization parameters for a selected connected device. As shown, user interface 500 may present one or more authorization options 504 (e.g., authorization options 504-1 to 504-4). Authorization options 504 may include any suitable combination of selectable items for managing the authorization parameters for the selected connected device. For example, options 504 may include options for changing an authorization status associated with the connected device (e.g., active, inactive, partially active, etc.), changing a duration of an authorization status associated with the connected device, changing a mode type for an authorization status associated with the connected device (e.g., allowing the device to keep their authorization outside the connected network), and/or changing a parental control level for an authorization status associated with the connected device (e.g., blocking content only suitable for adults). Specifically, a user may select an option 504 for authorizing a connected device to access the cloud-based service. Gateway device 108 may detect the selection and share a stored authentication token with the authorized device to permit access to the cloud-based service.

FIG. 5C shows user interface 500 after a new connected device has been detected. User interface 500 may present a notification and/or alert associated with the connected device after the connected device has requested access to the cloud-based service and/or connected to the network. User interface 500 may present information associated with the connected device, such as a current authorization status associated with the connected device, a device type associated with the connected device, and/or a set of users associated with the connected device. User interface 500 may present one or more detection options 506 (e.g., detection options 506-1 and 506-2) for managing authorization of the detected device. Detection options 506 may include any suitable combination of selectable items for initiating operations associated with the connected devices, such as changing an authorization status of the detected device and/or viewing more information associated with the detected device. For example, a user may select an option for authorizing a detected device that is currently unauthorized.

In certain embodiments, one or more of the systems, components, and/or processes described herein may be implemented and/or performed by one or more appropriately configured computing systems or devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing system or device or may be implemented on more than one physical computing system or device. Accordingly, system components may include any number of computing systems and devices, and may employ any of a number of computer operating systems.

In certain embodiments, one or more of the processes described herein may be implemented at least in part as instructions embodied in a non-transitory computer-readable medium and executable by one or more computing systems. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 6:
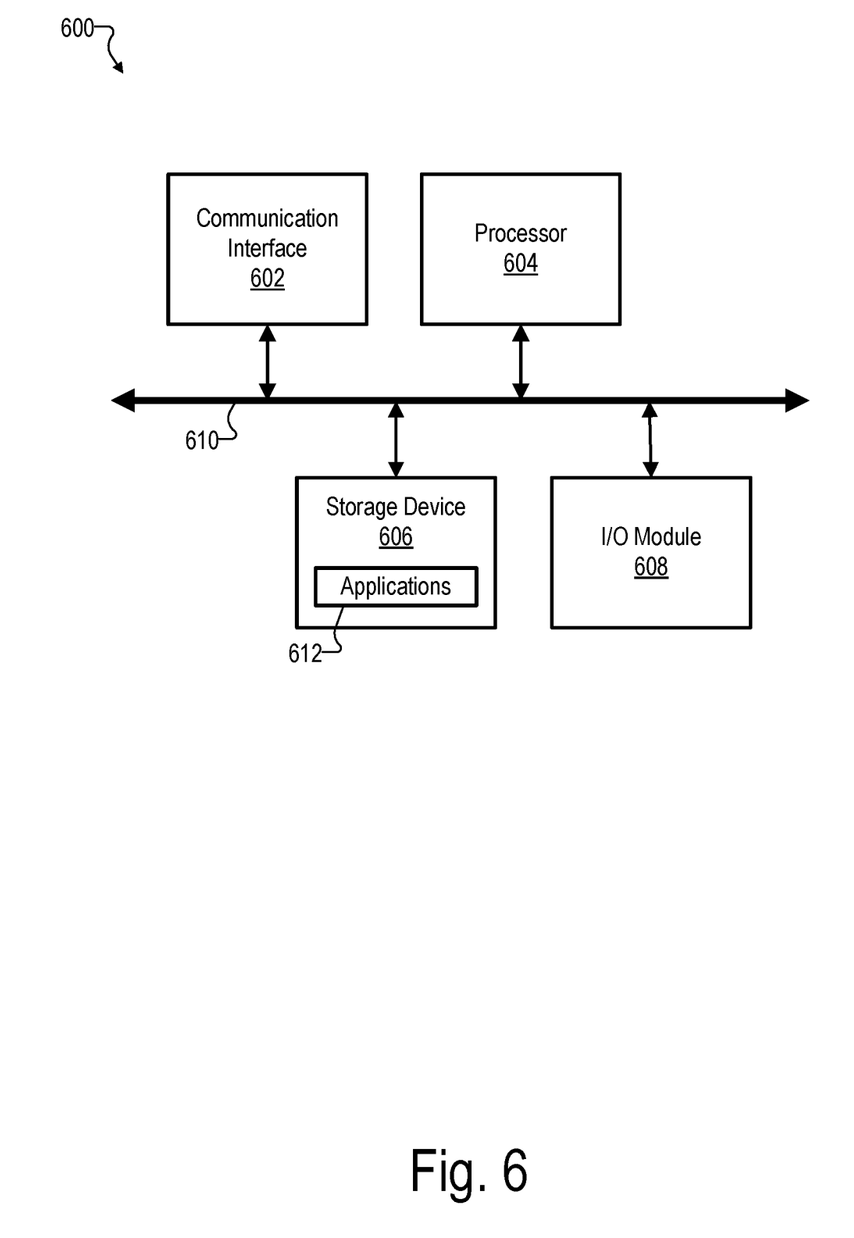
FIG. 6 depicts an illustrative computing device according to principles described herein.

FIG. 6 illustrates an exemplary computing system 600 that may be specifically configured to perform one or more of the processes described herein. For example, computing system 600 may implement a gateway device (e.g., gateway device 108), or any other computing systems or devices described herein.

As shown in FIG. 6, computing system 600 may represent any computing system or device that includes components such as a communication interface 602, a processor 604, a storage device 606, and an input/output ("I/O") module 608 communicatively connected via a communication infrastructure 610. While an exemplary computing system 600 is shown in FIG. 6, the components illustrated in FIG. 6 are not intended to be limiting. Additional or alternative components may be used in other embodiments. Components of computing system 600 shown in FIG. 6 will now be described in additional detail.

Communication interface 602 may be configured to communicate with one or more computing systems and/or devices. Examples of communication interface 602 include, without limitation, a wired network interface (such as a network interface card), a wireless network interface (such as a wireless network interface card), a modem, an audio/video connection, and any other suitable interface.

Processor 604 generally represents any type or form of processing unit capable of processing data or interpreting, executing, and/or directing execution of one or more of the instructions, processes, and/or operations described herein. Processor 604 may direct execution of operations in accordance with one or more applications 612 or other computer-executable instructions such as may be stored in storage device 606 or another computer-readable medium.

Storage device 606 may include one or more data storage media, devices, or configurations and may employ any type, form, and combination of data storage media and/or device. For example, storage device 606 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 606. For example, data representative of one or more executable applications 612 configured to direct processor 604 to perform any of the operations described herein may be stored within storage device 606. In some examples, data may be arranged in one or more databases residing within storage device 606.

I/O module 608 may include one or more I/O modules configured to receive user input and provide user output. One or more I/O modules may be used to receive input for a single virtual experience. I/O module 608 may include any hardware, firmware, software, or combination thereof supportive of input and output capabilities. For example, I/O module 608 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 608 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 608 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 600. For example, one or more applications 612 residing within storage device 606 may be configured to direct processor 604 to perform one or more processes or functions associated with communication facility 202 and/or processing facility 206 of system 200.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a gateway device configured to manage traffic between an on-premises network and a cloud-based service, that a first computing device connected to the on-premises network logs into the cloud-based service by way of the gateway device;
    storing, by the gateway device based on the detection, an authentication token provided to the gateway device by the cloud-based service;
    obtaining, by the gateway device, authorization data indicating that a second computing device connected to the on-premises network is authorized to access the cloud-based service; and
    sharing, by the gateway device based on the authorization data, the authentication token with the second computing device, the authentication token useable by the second computing device to access the cloud-based service.

2. The method of claim 1, wherein the obtaining the authorization data comprises receiving the authorization data from a remote computing device associated with the cloud-based service by way of an external network.

3. The method of claim 1, wherein the obtaining the authorization data comprises receiving the authorization data from the first computing device by way of the on-premises network.

4. The method of claim 1, wherein the authorization data is generated based on a user selection of an option presented within a graphical user interface displayed by the first computing device, the user selection of the option indicating that the second computing device is authorized to access the cloud-based service using the authentication token.

5. The method of claim 1, wherein the detecting that the first computing device logs into the cloud-based service comprises detecting that the first computing device logs into the cloud-based service using a password.

6. The method of claim 5, further comprising:
    detecting, by the gateway device, a modification to the password; and
    refreshing, by the gateway device based on the detecting the modification to the password, the authentication token; and
    sharing, by the gateway device, the refreshed authentication token with the second computing device.

7. The method of claim 1, further comprising providing, by the gateway device, the authentication token to the cloud-based service on behalf of the second computing device.

8. The method of claim 1, wherein the sharing the authentication token comprises providing a copy of the authentication token to the second computing device.

9. The method of claim 1, wherein the access by the second computing device of the cloud-based service using the authentication token is customizable by way of one or more parameters.

10. The method of claim 9, wherein the one or more parameters comprise one or more of an expiration date associated with the authentication token, an authentication level associated with the authentication token, or an application identifier associated with the authentication token.

11. The method of claim 9, wherein the gateway device is a gateway device and the one or more parameters are stored as metadata on the gateway device.

12. The method of claim 1, further comprising:
    obtaining, by the gateway device, additional authorization data indicating that a third computing device connected to the on-premises network is not authorized to access the cloud-based service; and
    denying, by the gateway device based on the additional authorization data, the third computing device access to the authentication token.

13. The method of claim 1, wherein the gateway device is configured to deploy a dedicated authentication application for managing the authentication token.

14. A gateway device comprising one or more processors to manage traffic between an on-premises network and a cloud-based service:
    the one or more processors configured to:
        detect that a first computing device connected to the on-premises network, logs into the cloud-based service by way of the gateway device;
        store, based on the detection, an authentication token provided to the gateway device by the cloud-based service;
        obtain authorization data indicating that a second computing device connected to the on-premises network is authorized to access the cloud-based service; and
        share, based on the authorization data, the authentication token with the second computing device, the authentication token useable by the second computing device to access the cloud-based service.

15. The gateway device of claim 14, wherein the authorization data is generated based on a user selection of an option presented within a graphical user interface displayed by the first computing device, the user selection of the option indicating that the second computing device is authorized to access the cloud-based service using the authentication token.

16. The gateway device of claim 14, wherein the detecting that the first computing device logs into the cloud-based service comprises detecting that the first computing device logs into the cloud-based service using a password.

17. The gateway device of claim 14, wherein the access by the second computing device of the cloud-based service using the authentication token is customizable by way of one or more parameters.

18. A non-transitory computer-readable medium storing instructions that, when executed, direct a processor to perform a process comprising:
    detecting that a first computing device connected to a on-premises network logs into a cloud-based service by way of a gateway device configured to manage traffic between the on-premises network and the cloud-based service;
    storing, based on the detection, an authentication token provided to the gateway device by the cloud-based service;
    obtaining authorization data indicating that a second computing device connected to the on-premises network is authorized to access the cloud-based service; and
    sharing, based on the authorization data, the authentication token with the second computing device, the authentication token useable by the second computing device to access the cloud-based service.

19. The computer-readable medium of claim 18, wherein the authorization data is generated based on a user selection of an option presented within a graphical user interface displayed by the first computing device, the user selection of the option indicating that the second computing device is authorized to access the cloud-based service using the authentication token.

20. The computer-readable medium of claim 18, wherein the access by the second computing device of the cloud-based service using the authentication token is customizable by way of one or more parameters.

\* \* \* \* \*